US009566840B2

United States Patent
Seethaler et al.

(10) Patent No.: US 9,566,840 B2
(45) Date of Patent: Feb. 14, 2017

(54) INDEPENDENT VEHICLE SUSPENSION HAVING A SPRING-LINK SUSPENSION STRUCTURE MADE FROM A FIBER COMPOSITE MATERIAL

(71) Applicant: Bayerische Motoren Werke Aktiengesellschaft, Munich (DE)

(72) Inventors: Ludwig Seethaler, Herbertshausen (DE); Hubert Scholz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/926,788

(22) Filed: Oct. 29, 2015

(65) Prior Publication Data

US 2016/0046162 A1    Feb. 18, 2016

Related U.S. Application Data

(63) Continuation of application No. PCT/EP2014/054150, filed on Mar. 4, 2014.

(30) Foreign Application Priority Data

Apr. 30, 2013   (DE) .................. 10 2013 207 910

(51) Int. Cl.
   *B60G 3/28*   (2006.01)

(52) U.S. Cl.
   CPC .......... *B60G 3/28* (2013.01); *B60G 2200/144* (2013.01); *B60G 2200/462* (2013.01); *B60G 2204/149* (2013.01); *B60G 2206/7101* (2013.01)

(58) Field of Classification Search
   CPC ..... B60G 3/28; B60G 7/001; B60G 2200/144; B60G 2200/462; B60G 2204/149; B60G 2206/7101; B60G 11/08
   See application file for complete search history.

(56) References Cited

U.S. PATENT DOCUMENTS 3,429,566 A * 2/1969 Rosendale ............... B60G 3/28
                                                              267/266
4,457,536 A     7/1984 Rumpel
                      (Continued)

FOREIGN PATENT DOCUMENTS

DE          102 16 244 A1    12/2002
DE      10 2008 043 330 A1    5/2010
                      (Continued)

OTHER PUBLICATIONS

International Search Report (PCT/ISA/210) issued in counterpart International Application No. PCT/EP2014/054150 dated Apr. 22, 2014, with English translation (Six (6) pages).
(Continued)

*Primary Examiner* — Paul N Dickson
*Assistant Examiner* — Timothy Wilhelm
(74) *Attorney, Agent, or Firm* — Crowell & Moring LLP

(57) ABSTRACT

An independent suspension for a vehicle includes a spring-link suspension structure which is made from a fibrous composite material, is substantially U-shaped when viewed in the vehicle longitudinal direction. Ends of upper and lower members are secured to the vehicle body or a carrier connected thereto. At least one of these securements has no rotational degree of freedom about an axis extending in the vehicle longitudinal direction, while a wheel hub is connected to the base of the U-shaped spring-link suspension structure in order to secure a vehicle wheel. At least one of the members is secured to the vehicle body or to the carrier in a substantially rigid manner i.e. aside from low levels of elasticity, and no further wheel guiding suspension link is provided that substantially extends in the vehicle longitudi- (Continued)

nal direction. As a result, in order to achieve a desired toe-in increase when braking, a recess is provided in at least one of the members. The recess extends from the point at which the wheel hub is secured to the base and across only a subregion of the member in the longitudinal direction thereof.

7 Claims, 3 Drawing Sheets

(56) References Cited

U.S. PATENT DOCUMENTS

| | | | |
|---|---|---|---|
| 6,616,159 B2* | 9/2003 | Lawson | B29C 70/222 |
| | | | 280/124.135 |
| 6,688,586 B1* | 2/2004 | Moore | B60G 3/28 |
| | | | 267/230 |
| 8,640,806 B2* | 2/2014 | Worup | B60G 3/28 |
| | | | 180/209 |
| 2006/0046826 A1* | 3/2006 | Gilmartin | B60G 3/28 |
| | | | 463/19 |

FOREIGN PATENT DOCUMENTS

| | | |
|---|---|---|
| DE | 10 2009 002 939 A1 | 11/2010 |
| DE | 20 2011 105 547 U1 | 2/2012 |
| DE | 10 2011 112 058 A1 | 3/2013 |
| EP | 0 213 367 A2 | 3/1987 |
| GB | 2 380 717 A | 4/2003 |
| JP | 2000-177346 A | 6/2000 |
| WO | WO 2011/065376 A1 | 6/2011 |

OTHER PUBLICATIONS

German Search Report issued in counterpart German Application No. 10 2013 207 910.9 dated Apr. 25, 2014, with English translation (Twelve (12) pages).

* cited by examiner

INDEPENDENT VEHICLE SUSPENSION HAVING A SPRING-LINK SUSPENSION STRUCTURE MADE FROM A FIBER COMPOSITE MATERIAL

CROSS REFERENCE TO RELATED APPLICATIONS

This application is a continuation of PCT International Application No. PCT/EP2014/054150, filed Mar. 4, 2014, which claims priority under 35 U.S.C. §119 from German Patent Application No. 10 2013 207 910.9, filed Apr. 30, 2013, the entire disclosures of which are herein expressly incorporated by reference.

BACKGROUND AND SUMMARY OF THE INVENTION

The invention relates to an independent suspension of a vehicle having a spring-link (control arm) structure which is constructed from a composite fiber material and which is constructed so as to be substantially U-shaped when viewed in the longitudinal direction of the vehicle. An upper member and lower member are secured at the end side to the vehicle body structure or a carrier which is connected thereto. At least one of these securings does not have any degree of rotational freedom about an axis which extends in the vehicle longitudinal direction, while a wheel hub is connected to the base of the U-shaped spring-link structure in order to secure a vehicle wheel. With regard to the prior art, in addition to DE 10 2008 043 330 A1, reference may be made to DE 102 16 244 A1 (having U.S. counterpart U.S. Pat. No. 6,616,159 B2).

Lightweight construction is becoming increasingly important in vehicle construction, in particular in passenger vehicles. In particular, a lightweight construction is particularly important in the field of vehicle chassis. In this context, wheel guiding elements may be constructed from composite fiber material and, consequently, in addition to a wheel-guiding function which has previously been performed by so-called wheel guiding links, also perform the function of a carrier spring which has previously been constructed in most cases as a helical spring and via which the vehicle body is proportionately supported on the respective wheel which is guided by the wheel guiding element. The two documents mentioned in the introduction disclose examples of such wheel guiding elements which are referred to in this instance as a spring-link (control arm) structure.

Based on DE 102 16 244 A1 mentioned above, it is an object of the present invention to provide a functionally advantageous independent suspension, which is distinguished by a small spatial requirement.

This and other objects are achieved in that at least one of the upper and lower members is substantially, that is to say, with the exception of low levels of elasticity, rigidly secured to the vehicle body or to the carrier mentioned. No additional wheel guiding link is provided which extends substantially in the longitudinal direction of the vehicle, for which reason, in order to achieve a desired increase of toe-in during braking, there is provided in at least one of the members a recess. The recess extends from the securing of the wheel hub to the base only over a part-region of the member in the longitudinal direction thereof.

According to the invention, unlike the prior art mentioned, no wheel-guiding longitudinal link or the like is provided, but instead the respective vehicle wheel is guided exclusively by the said spring-link structure which comprises a composite fiber material and which is U-shaped when viewed in the longitudinal direction of the vehicle. This, of course, minimizes the spatial requirement of an independent suspension according to the invention. To this end, at least one of the members is ultimately substantially rigidly secured to the vehicle body (where applicable, with the interposition of a carrier which will no longer be mentioned below for reasons of simplicity) so that this member of the spring-link structure can also perform the longitudinal guiding of the wheel. Ideally, a support base which is relatively wide or as wide as possible is intended to be provided between the member and the vehicle body, which will be discussed in greater detail below.

However, first explained herein is another inventively significant feature which is proposed in particular for use of such an independent suspension on the rear axle of a two-track vehicle, which axle is intended to be constructed as known in such a manner that the wheel during braking, that is to say, under the action of a braking force, moves increasingly in the direction of toe-in. Accordingly, in at least one of the members (and preferably in the upper member), there is provided a recess which extends from the base only over a part-region thereof in the longitudinal direction thereof, whereby starting from a "full cross-section" which is closed in the region of the connection of the member to the vehicle body, there are formed quasi two link portions which are separate from each other and which extend as far as the securing location of the wheel hub on the base of the U-shaped spring-link structure. When viewed in the opposite direction, consequently, starting from the securing location of the wheel hub to the spring-link structure according to the invention, on which securing location, for example, there may be retained a so-called wheel carrier on which the wheel hub is supported in a suitable manner, two mutually separate link portions of the spring structure lead in at least one of the members as far as a location at which these two link portions in a state adjacent to each other are combined to form a member portion which forms a full cross-section without any recess and which is then continued as far as the securing of this member to the vehicle body.

If the upper member of a spring-link structure according to the invention is now constructed in the manner described, there is (also) produced on this upper member under the action of a braking force which acts on the wheel and which is supported as a torque on the spring-link structure, a torsion moment. The torsion moment inwardly deforms in a downward direction the front link portion thereof when viewed in the travel direction in the region of the recess, and deforms outwardly in an upward direction the rear link portion thereof when viewed in the travel direction. This results in a desired increase of the toe-in of the wheel which is guided by the spring-link structure.

The effect which has just been described can be reinforced by the two members being substantially, that is to say, with the exception of low levels of elasticity, rigidly secured to the vehicle body or to the carrier mentioned and the recess being constructed in both members so as to be coherent over the base.

It has already been briefly mentioned that the securing of the "free" end(s) of the member(s) to the vehicle body is intended to form a support base which is relatively wide or as wide as possible in order to be able to achieve good longitudinal guiding of the wheel by the proposed spring-link structure. It is proposed as a preferred embodiment that the securing which is substantially, that is to say, with the exception of low levels of elasticity, rigid be constructed in the manner of a tongue and groove connection having a groove which extends substantially in the vehicle longitudinal direction in one of the elements which are intended to be connected to each other, and in which a connection structure of the tongue and groove connection, which structure is connected in an appropriate manner to the other element or which is provided thereon, engages in a positive-locking manner, with a resilient layer being interposed, and is retained in an appropriate manner. The resilient layer which is located therebetween is not only used for a desired acoustic decoupling between the wheel and vehicle body, but is also proportionately advantageous for a desired longitudinal resilience, that is to say, resilient action of the wheel suspension in the vehicle longitudinal direction (for example, with respect to occurrences of unevenness such as transverse joints or the like).

It is further optionally proposed that at least one of the members when viewed in the longitudinal direction of the vehicle, at the side thereof facing the vehicle front or at the front link portion, have a smaller thickness when measured in the direction of the vehicle vertical axis than at the side thereof facing the vehicle rear or at the rear link portion. The guided wheel thereby moves increasingly into toe-in under the action of lateral forces, as desired.

Other objects, advantages and novel features of the present invention will become apparent from the following detailed description of one or more preferred embodiments when considered in conjunction with the accompanying drawings.

BRIEF DESCRIPTION OF THE DRAWINGS

In all of the Figures, identical elements are indicated using the same reference numerals.

DETAILED DESCRIPTION OF THE DRAWINGS

Figure 1:
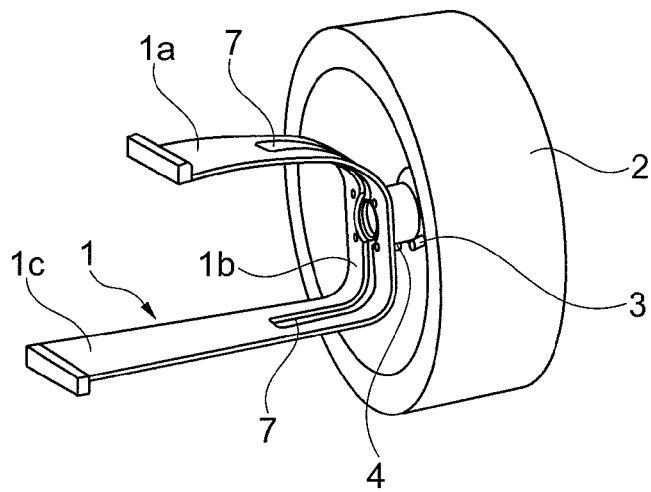
FIG. 1 is a perspective view from a front inner side of a spring-link structure according to an embodiment of the invention with a left rear wheel of a passenger vehicle (without any vibration dampers), which wheel is flange-mounted to a wheel carrier having a hub.
Figure 2:
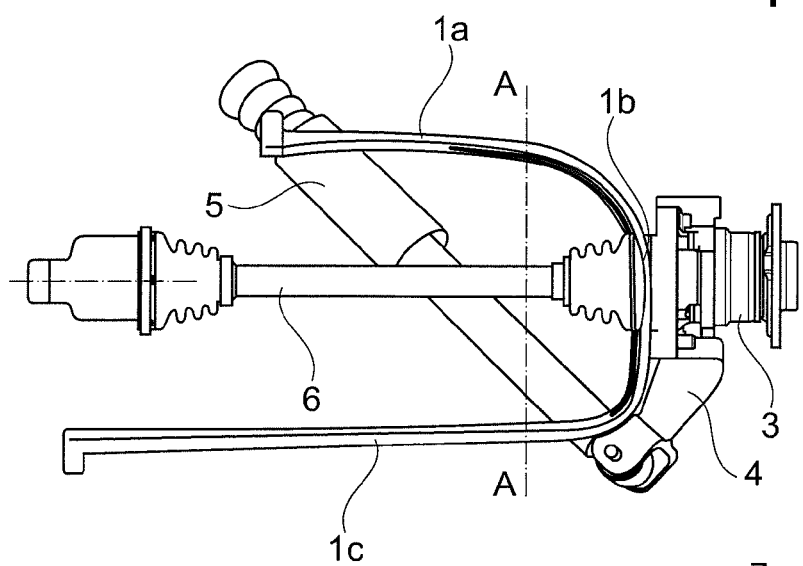
FIG. 2 illustrates the spring-link structure with the wheel carrier having the hub with a vibration damper (but without a wheel) in a view counter to a travel direction.

First, with reference to FIGS. 1 to 5, there is designated 1 a spring-link structure which includes a fiber-reinforced—in particular a glass-fiber-reinforced—plastics material and which is substantially formed in a U-shaped manner. The spring-link structure has two members 1a, 1c and a base 1b which connects the two members 1a, 1c to each other. The free ends of the members 1a, 1c in these Figures are, in a manner explained below with reference to FIGS. 6, 7, secured to the vehicle body (which is not shown in FIGS. 1 to 5) substantially so rigidly that this spring/link structure 1 can guide a wheel 2 (only illustrated in FIG. 1) of the vehicle. The wheel is secured to a hub 3 which itself is secured to a wheel carrier 4 (only illustrated in a simplified manner in FIG. 1). The wheel carrier itself is secured to the base 1b of the spring/link structure 1, both in the transverse direction of the vehicle, that is to say, in the direction of the rotation axis (not illustrated) of the wheel 2 (and in the viewing direction of FIG. 3), and in the longitudinal direction of the vehicle (=viewing direction of FIG. 2).

In addition, as a result of the substantially rigid securing thereof to the vehicle body, the spring-link structure 1 also guides the wheel in the direction of the vehicle vertical axis. In this direction, as a result of the elastic deformability of the members 1a, 1c, there is a degree of freedom which is limited by elastic force or elastic action of an elastic member deformation. In this embodiment—as can be seen—by the upper member 1a being constructed to be shorter than the lower member 1c in the transverse direction of the vehicle, there is produced, as desired via the wheel travel (in the vertical direction), a progressive increase of the negative wheel camber. In parallel with the resilient action of the spring-link structure 1 there acts a damper 5 which is secured, on the one hand, to the wheel carrier 4 and which is supported on the other hand on the vehicle body (not illustrated). In addition to the structural elements which have been illustrated so far, a drive shaft 6 for the wheel 2 is also shown in these Figures.

As can be seen, in both members 1a, 1c in this instance there is provided a recess 7. The recess 7 extends from the securing of the wheel hub 3 (or the wheel carrier 4) to the base 1b of the spring-link structure 1 only over a part-region of the members 1a, 1c in the longitudinal direction thereof. The recess 7 is constructed so as to be coherent over the base 1b or through the base 1b. The technical background for this recess 7 was explained extensively above, that is to say that, in the absence of a wheel-guiding link on the wheel 2 extending substantially in the longitudinal direction of the vehicle, a desired increase of toe-in can thereby be achieved when the vehicle or the wheel 2 is braked. The link portions of the members 1a, 1c of the spring-link structure 1 as mentioned in the previous explanation are designated in FIGS. 3, 4, 5 for the upper member 1a with the additional letter "v" for the front link portion and "h" for the rear link portion taking into account the travel direction of the vehicle indicated in FIGS. 3, 4 by the arrow F.

Figure 3:
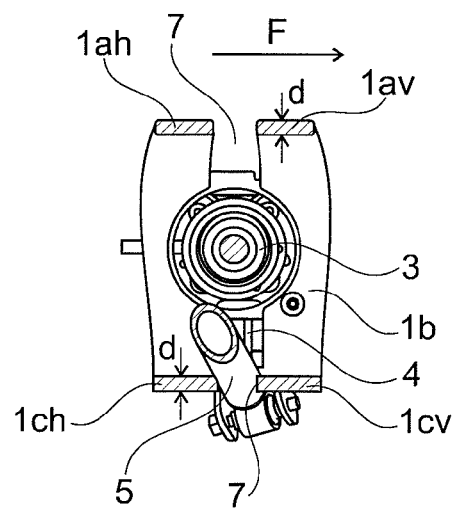
FIG. 3 is a view taken along the section line A-A of FIG. 2.
Figure 4:
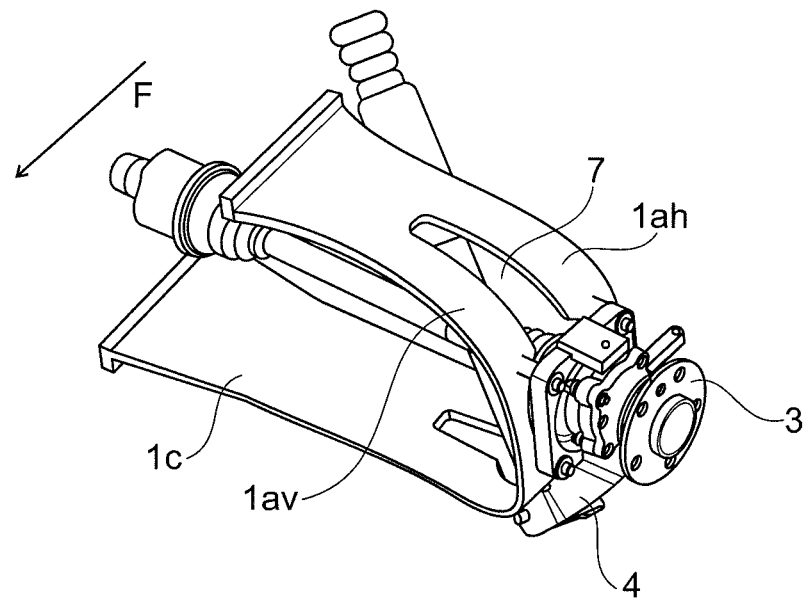
FIG. 4 illustrates another spatial view of the spring-link structure of FIG. 2.
Figure 5:
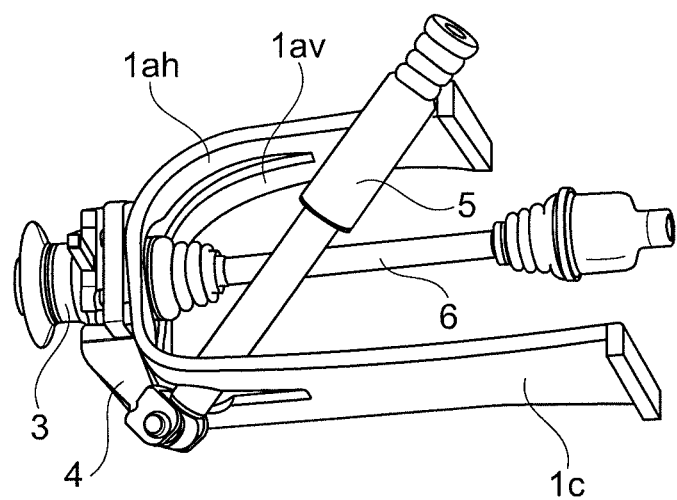
FIG. 5 is yet another spatial view of the spring-link structure of FIG. 2.

In FIG. 3, it cannot be seen that both members 1a, 1c at the link portions 1av, 1cv thereof, which are at the front in the travel direction F, have or may have a smaller thickness d when measured in the direction of the vehicle vertical axis than at the link portions 1ah, 1ch at the rear in the travel direction F. With this measure of the different thickness d, the guided wheel 2, under the action of lateral forces acting on the wheel in the transverse direction of the vehicle, as desired in principle, moves increasingly into toe-in since the front link portions 1av, 1cv are capable of counteracting these lateral forces with a smaller resistance than the rear link portions 1ah, 1ch and, therefore, under lateral forces—even if only slightly—become deformed to a slightly greater extent in the vertical direction than the rear link portions 1ah, 1ch.

Figure 6:
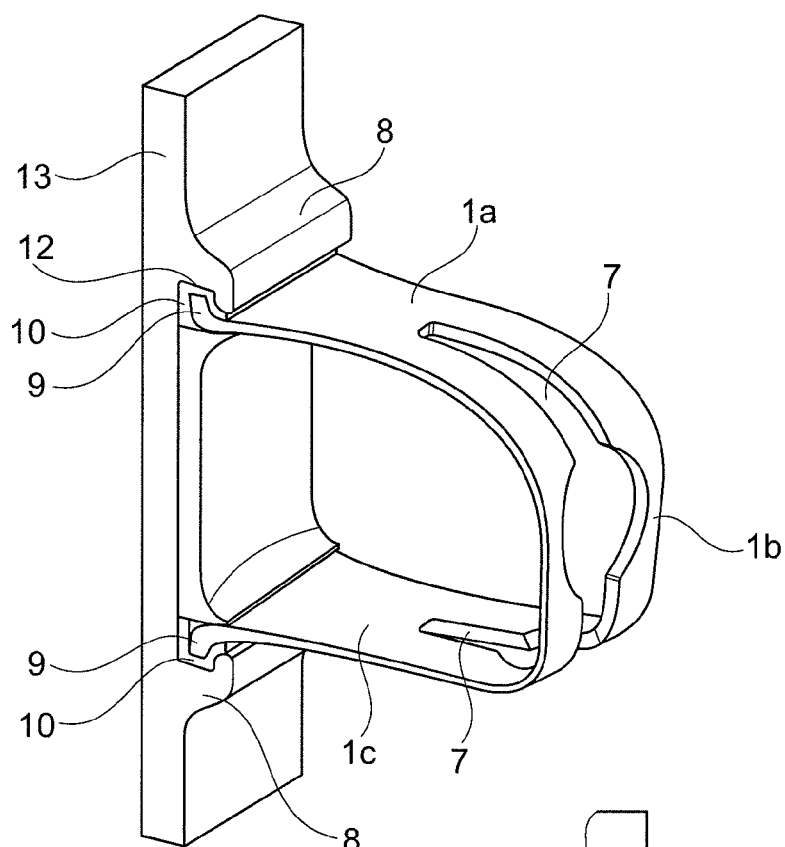
FIG. 6 is a perspective view illustrating details of the securing of the ends of the members of the spring-link structure to the vehicle body, which details were omitted in FIGS. 1-5.
Figure 7:
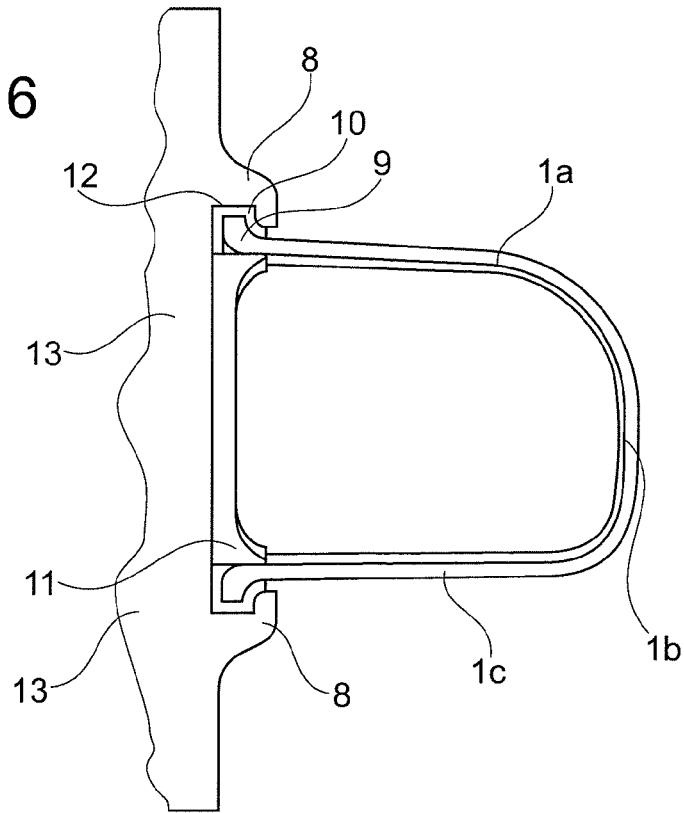
FIG. 7 is a lateral plan view in a longitudinal direction of the vehicle of a spring-link structure according to another embodiment of the invention, which embodiment differs in terms of the length of the members from that of FIGS. 1-5.

As shown in FIGS. 6 and 7, the rigid securing (with the exception of low levels of elasticity) of the spring/link structure 1 to the vehicle body 13 is constructed in the manner of a tongue and groove connection having a groove 12 which extends substantially in the longitudinal direction of the vehicle (=travel direction F) in a retaining structure 8 which is provided on the vehicle body 13. As a result of the groove 12, the retaining structure 8 protrudes with an L-shaped cross-section from a vertical wall (also reference numeral 13) of the vehicle body 13. In this groove 12, a so-called connection structure 9 which is provided at the free end of the respective member engages in a positive-locking manner with a resilient layer 10 being interposed. In this instance, the connection structures 9 of the upper member 1a and the lower member 1c are constructed in the manner of a brim which is directed outward with respect to the U-shaped spring/link structure 1, so that this spring/link structure 1 with the two connection structures 9 in the view of FIG. 7 is quasi shown in the form of a hat (having a "hat brim") which is illustrated in a longitudinal section. It can further be seen in FIG. 6 that the recess 7 in the base 1b is constructed in a circular manner and, in particular, wider than in the members 1a, 1c in order to be able to guide the output shaft 6 through this recess 7 to the wheel hub 3 (not illustrated in this Figure).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An independent suspension of a vehicle, comprising:
   a spring-link structure formed of a composite fiber material and configured to have a substantially U-shape viewed in a longitudinal direction of the vehicle,
   wherein the spring-link structure comprises an upper member and a lower member as well as a base member connecting the upper and lower members, the upper and lower members being secured at end sides thereof to a vehicle body or a carrier connected to the vehicle body, at least one securement not having any degree of rotational freedom about an axis extending in the longitudinal direction of the vehicle;
   a wheel hub connected to the base of the U-shaped spring-link structure in order to secure a vehicle wheel;
   wherein at least one of the upper and lower members is substantially rigidly secured to the vehicle body or to the carrier, and no additional wheel guiding link is provided that extends substantially in the longitudinal direction, and
   a recess arranged in at least one of the upper and lower members, the recess extending from the connection of the wheel hub to the base only over a part-region of the member in a longitudinal direction of the member in order to achieve a desired increase in toe-in during braking.

2. The independent suspension according to claim 1, wherein the upper and lower members are substantially rigidly secured to the vehicle body or the carrier, and further wherein the recess is continuous in both the upper and lower members across the base.

3. The independent suspension according to claim 2, wherein
   at least one of the upper and lower members, when viewed in the longitudinal direction of the vehicle, at a link portion of the at least one member facing a vehicle front has a smaller thickness in a vehicle vertical axis direction than a link portion thereof facing a vehicle rear.

4. The independent suspension according to claim 3, wherein the securement of the upper and lower members to the vehicle body comprises a tongue and groove connection, wherein
   a groove of the and groove connection extends substantially in the longitudinal direction of the vehicle,
   a tongue of the tongue and groove connection engages in a positive-locking manner with the groove, wherein a resilient layer is interposed and retained.

5. The independent suspension according to claim 1, wherein
   at least one of the upper and lower members, when viewed in the longitudinal direction of the vehicle, at a link portion of the at least one member facing a vehicle front has a smaller thickness in a vehicle vertical axis direction than a link portion thereof facing a vehicle rear.

6. The independent suspension according to claim 1, wherein the securement of the upper and lower members to the vehicle body comprises a tongue and groove connection, wherein
   a groove of the tongue and groove connection extends substantially in the longitudinal direction of the vehicle,
   a tongue of the tongue and groove connection engages in a positive-locking manner with the groove, wherein a resilient layer is interposed and retained.

7. An independent suspension of a vehicle, comprising:
   a spring-link suspension structure formed of a composite fiber material and having a U-shape viewed in a vehicle longitudinal direction, upper and lower members of the U-shape being interconnected by a base-member,
   wherein ends of the upper and lower members are secured to a vehicle body or a carrier connected to the vehicle body, at least one such securement having no rotational degree of freedom about an axis extending in the vehicle longitudinal direction;
   a wheel hub connected to the base member of the U-shaped spring-link suspension structure, the wheel hub being configured to secure a vehicle wheel;
   wherein at least one of the upper and lower members is secured to the vehicle body or to the carrier in a substantially rigid manner and no further wheel-guiding suspension link is provided that extends substantially in the vehicle longitudinal direction;
   wherein, in order to obtain a desired toe-in increase of the vehicle wheel when braking, a recess is arranged in at least one of the upper and lower members, the recess extends from a point at which the wheel hub is secured to the base member across only a sub-region of the at least one limb in a longitudinal direction of the at least one limb.

* * * * *